United States Patent
Daskalakis (10) Patent No.: US 10,482,524 B1
(45) Date of Patent: Nov. 19, 2019

(54) ELECTRONIC PAYMENT METHODS AND SYSTEMS

(71) Applicant: Panos Daskalakis, Boston, MA (US)

(72) Inventor: Panos Daskalakis, Boston, MA (US)

(*) Notice: Subject to any disclaimer, the term of this patent is extended or adjusted under 35 U.S.C. 154(b) by 1271 days.

(21) Appl. No.: 14/339,870

(22) Filed: Jul. 24, 2014

Related U.S. Application Data (60) Provisional application No. 61/863,184, filed on Aug. 7, 2013.

(51) Int. Cl.
*G06Q 30/06* (2012.01)
*G06Q 20/12* (2012.01)

(52) U.S. Cl.
CPC ......... *G06Q 30/0635* (2013.01); *G06Q 20/12* (2013.01)

(58) Field of Classification Search
CPC .................. G06Q 30/0635; G06Q 20/12
See application file for complete search history.

(56) References Cited

U.S. PATENT DOCUMENTS

| | | | | |
|---|---|---|---|---|
| 2008/0189189 A1* | 8/2008 | Morgenstern | ......... | G06Q 30/02 705/12 |
| 2011/0029399 A1* | 2/2011 | Asher | ......... | G06Q 20/102 705/26.1 |
| 2011/0231269 A1* | 9/2011 | Mulhall | ......... | G06Q 20/204 705/17 |
| 2012/0232981 A1* | 9/2012 | Torossian | ......... | G06Q 30/06 705/14.27 |
| 2012/0246034 A1* | 9/2012 | Kolios | ......... | G06Q 30/06 705/27.1 |
| 2012/0259668 A1* | 10/2012 | LeBeau | ......... | G06Q 30/02 705/5 |
| 2012/0296773 A1* | 11/2012 | Carrott | ......... | G06F 21/10 705/26.41 |
| 2013/0006805 A1* | 1/2013 | Ulli | ......... | G06Q 30/06 705/26.8 |
| 2014/0207612 A1* | 7/2014 | Isaacson | ......... | G06Q 30/0635 705/26.8 |
| 2015/0088561 A1* | 3/2015 | Charles | ......... | G06Q 10/02 705/5 |

(Continued)

OTHER PUBLICATIONS

Evangelista, Benny, Skip the Lines; App lets sports fans order from their seats, Mar. 19, 2011, San Francisco Chronicle, D1, pp. 1-2. (Year: 2011).*

*Primary Examiner* — Jason B Dunham
*Assistant Examiner* — Brittany E Bargeon
(74) *Attorney, Agent, or Firm* — Burns & Levinson, LLP; George N. Chaclas (57) ABSTRACT

A server for facilitating commerce via a distributed computing network. The server memory stores an instruction set, customer data, vendor data, venue data, and server data related to a sponsoring entity. A processor is operative to: provide a portion of the vendor data to a first client based upon the client entering a venue, wherein the portion of the vendor data relates to the venue; receive an order for a product of a vendor from the first client, wherein the product is included in the portion of the vendor data; provide the order to a second client of the vendor so the vendor can fill the order; attend to collection of funds in payment for the order from the first customer by using a portion of the customer data; and attend to payment of funds for the order to the vendor by using a portion of the server data.

8 Claims, 3 Drawing Sheets

(56) References Cited

U.S. PATENT DOCUMENTS

2015/0120406 A1* 4/2015 Ekberg .............. G06Q 30/0252
                                                    705/14.5
2015/0242888 A1* 8/2015 Zises ................. G06Q 30/0252
                                                    705/14.5

* cited by examiner

ELECTRONIC PAYMENT METHODS AND SYSTEMS

CROSS-REFERENCE TO RELATED APPLICATION

This application claims priority to U.S. Provisional Patent Application No. 61/863,184 filed Aug. 7, 2013, which is incorporated herein by reference.

BACKGROUND OF THE INVENTION

1. Field of the Invention

The subject disclosure relates to methods and systems for electronic payment via a distributed computing network, and more particularly to improved methods and systems for making electronic payments securely and conveniently without direct interaction on payment between the customer and the provider of goods and services.

2. Background of the Related Art

Commerce, at its core, is basically a series of informational exchanges that result in a transaction. A vendor offers its goods and services for sale from a location at a certain price. The location could be anywhere including, but not limited to, a brick & mortar store, the customers home, or a Web site on the internet. If the customer decides that he or she needs or wants the goods and services at the price at which the vendor offers them to the customer, the customer purchases the goods. From the time that the Lydians invented coins in 700 BC, until now, the most basic transaction has been simple; the customer pays cash for the goods and services and then the customer is either provided the services or the goods that were purchased.

Somewhere along the way, vendors allowed customers with whom they had a relationship, and trusted, to purchase items on account and pay at the end of the month or some other mutually agreed upon timeframe. Around the year 1850, consumer installment loans were introduced in the United States, which led to Singer's famous dollar down and dollar a week credit program. The use of consumer installment loans exploded with automobiles.

With the automobile, consumers mobility increased. Instead of dealing with one local store, even if it was part of a national chain, consumers could visit far flung stores while stopping at service stations for gasoline along the way. To service these customers, oil companies created the credit card in the 1920's. Around the year 1938, some companies began allowing customers to make purchases using other companies' credit cards.

The first bank credit card was created in 1946 by John Biggins of the Flatbush National Bank in Brooklyn, N.Y. In 1950, Diners Club introduced its' credit card in the United States allowing card holders to purchase food at participating restaurants. Diners club was followed by major credit card providers, Visa, MasterCard, American Express, and Discover, which have now become ubiquitous. However, despite advancements in credit card services, most transactions have remained essentially the same. The customer purchases goods and services from a vendor in a face to face transaction, actually or telephonically, and receives the desired products and/or services. That all changed in 1998.

While the general public was embracing the internet in 1994, it took until 1998 for protocols such as HTTP and DSL to develop and enable reliable connections between companies and their customers to facilitate virtual transactions. By 2000, every imaginable product was available on the Internet. Many brick & mortar companies have also realized the advantages of having an ecommerce option and added a strong Internet presence to their business model.

A major advancement in ecommerce occurred in approximately the year 2007. Smartphones combined a phone with a touchscreen and Web access, as well as many other features. Smartphones allow customers to connect to businesses from practically anywhere, utilizing Wi-Fi technology or through their wireless service provider. However, content rich Web sites designed for powerful computers utilizing broadband connections proved overwhelming for smartphones with smaller processors and wireless Internet connections. As a result, connecting to a Web site and transacting commerce was an unsatisfactorily slow process initially.

In response, the market self-organized to create the technology necessary for a more vibrant mobile ecommerce environment. Open architecture created an explosion of third party applications (Mobile Apps) for the popular mobile operating systems such as Apple's IOS and Google's Android operating systems. These Mobile Apps were adopted quickly by consumers. As of the end of 2012, downloads of Mobile Apps for the Apple IOS amounted to a total of 40 billion. Additionally, many businesses such as eBay, Amazon, and Wal-Mart have created mobile friendly Web sites and/or Mobile Apps. As a result, demand for more bandwidth and access has driven supply and advancements, which are expected to continue.

Four retail business models remain prevalent.

Traditional Brick & Mortar business model: While many of these businesses have a tremendous online presence, the vendor and the customer must eventually physically meet with each other. For example, you can order tickets to a event online, but you must go to the stadium or arena to attend the event. Many other examples include doctor's appointments, airline tickets, hotel rooms, grocery stores, restaurants, and ATM's.

Semi-web-based business model: To a varying degree, many brick & mortar businesses have some online ecommerce capability beyond a Web site such as a local restaurant where a customer can order food for pick up or delivery, or where the consumer can buy a specialty items for shipment. Retail giants such as Safeway, Wal-Mart and Home Depot allow customers to order items online for delivery or in-store pickup.

Web-based business model: Web based businesses only operate online. The goods and services are delivered to the customers via store truck, common carrier, or in some cases electronically such as by email. These types of businesses include Zappos, Amazon, iTunes and StubHub.

Third-party Web Services business model: Third-party Web Services businesses utilize third parties to provide them with an Internet presence and other value added services. Third-party Web Services businesses may be brick & mortar stores or may sell only through one or more third party service providers. Currently, eBay is exclusively based on this model and a large part of Amazon's business is based on this model as well. Sears, among others, also offers similar services. The services provided by these Third-party Web Services companies vary but could include listing the goods and services on the Web site, inventory control, and order processing; including payment services.

In addition to these four business models, new technologies and services have evolved to support these new retail models.

Payment Services: Established in 1995, eBay enabled individuals and small businesses to sell to each other through an online auction process. Since very few of these sellers had pricey credit card capabilities, almost all transactions on eBay were done by paper. Once an auction closed, the buyer would send the seller a check or a money order, and once the payment was received and had cleared the bank, the seller would send the buyer the merchandise. If the merchandise was not as advertised, the buyer could give the seller a poor review. While this didn't help the buyer much, it would eventually lead to the seller having poor eBay ratings, which in turn would help future buyers.

In May of 1999, eBay purchased Billpoint, which was a person to person payment service founded in 1998 that would allow eBay buyers to use credit cards. After the purchase, Billpoint was taken offline, integrated into eBay, and then re-launched as eBay Payments in late 1999. eBay Payments was originally only available to eBay users, but it was re-launched to non-eBay customers in the second quarter of 2000. In the meantime, PayPal, a person to person payment system was launched in March of 2000.

PayPal utilized customer networking to quickly build their customer base, at one time offering customers $10.00 to join and referral fees for getting others to join. Soon, sellers preferred PayPal because so many customers were using PayPal and buyers preferred PayPal because so many sellers offered it. In February of 2000, PayPal had an average of approximately 200,000 daily eBay auctions promoting PayPal while eBay Payments had 4,000. By April 2000, more than 1 million eBay auctions promoted PayPal, 70% of all eBay auctions promoted PayPal, and 1 in 4 eBay auctions closed using PayPal. In July of 2002, eBay, despite enormous promotional efforts, conceded that eBay Payments couldn't catch up to PayPal and announced the purchase of PayPal for $1.5 billion in stock. At the time 70% of eBay auctions accepted PayPal, while only 27% accepted eBay Payments.

At the same time, several competing firms were also launched to address the person to person payment issues at eBay. In 2000, Citibank launched C2it, which was closed in November of 2003. Yahoo purchased Athas' dotBank in 1999, which they launched as Yahoo Pay Direct in 2000 and shut down in November of 2004. BidPay was founded in 1999 and purchased by First Data and Western Union in 2001. BidPay ceased operations in December of 2005 and was purchased by CyberSource Corporation in March of 2006.

In 2006, Google announced Google Checkout, which provided one-click online checkout services to online third party Web sites. Although the backend model was different, Google Checkout functioned similar to PayPal in that instead of the customer entering their shipping and credit card information when checking out online, the customer clicked the Google Checkout Icon at a participating business and entered a personal identification number. Once the customer's credentials are authenticated, the system provides the vendor with the customer's shipping and payment information. In addition to third party Web sites, Google Checkout is used to process transactions related to Google products. In May of 2013, Google announced that it is discontinuing Google Checkout to focus on Google Wallet, a mobile payment system.

As the mobile device market experienced explosive growth over the last few years, a slew of companies entered the mobile payments market with their own version of the digital/mobile wallet. These include offerings from most major banks and credit card providers such as Bank of America, Citibank, VISA, and MasterCard, as well as offerings by industry titans such as PayPal, Google, and Apple, and startups such as Squareup and LevelUp. All of these companies deal with face to face transactions in a similar manner, requiring an interface with a point of sale device such as a register, but they use several different methods and technologies to effect these interfaces and complete transactions. The four largest service providers in this field are PayPal, Google Wallet, Square Wallet, and Levelup.

PayPal became the instant leader because the PayPal Digital Wallet enables their active account holders to utilize their PayPal accounts in face to face transactions. It is a digital wallet approach, rather than a mobile wallet approach. The difference is that a digital wallet does not require a mobile device unless the customer wants an immediate receipt on their mobile device. A mobile wallet requires a mobile device to interface with the point of sale device. The PayPal service requires customers to enter their phone number and a personal identification number (PIN) into a point of sale device which effects the transaction on PayPal's servers, commonly known as in the cloud, utilizing the PayPal system. Alternatively, customers not comfortable entering their phone number, may swipe a PayPal card to provide account information and enter a PIN to effect a transaction. To utilize the PayPal system, the vendor and customer must be enrolled in the PayPal payment service.

Google, by virtue of its size, also has some distinct market advantages. The Google Wallet requires the customer to download a Mobile App on their mobile device. The Google Wallet system uses near field communications (NFC) to interface with the point of sale device to effect a transaction in the cloud. The customer simply passes their mobile device near the point of sale equipment. The point of sale equipment reads the information from the phone and the software provided to the vendor is able to process the transaction in the cloud. The vendor never has the customer's actual credit card information but unlike other services, the vendor can use their own payment gateway. While Google Wallet requires the vendor to have an NFC reader, which is an additional cost, as more applications for this technology have evolved, most point of sale equipment providers are making NFC readers a standard feature in their devices.

Squareup is another approach that is making strides in the merchant payments sector; especially among small vendors for whom traditional merchant accounts and payment gateways are too expensive. Squareup offer a mobile wallet, called Square Wallet, that uses a Mobile App and the global positioning system (GPS) to recognize when a customer is at a vendor's location that offers the Square payment system. When a customer using Square Wallet enters an establishment that accepts Square Wallet for payments, the customer taps pay with Square Wallet on their mobile device. When the customer is in, or in some cases just near, an establishment, the customers photo and name appear on the vendor's point of sale device.

When the customer arrives at the front of the line the vendor selects the customer from the photos of the several that may be on the screen at the time and confirms the name with the customer. The customer places their order and when done, the customer taps pay this vendor on the customer's mobile device. The customer can add a tip at this time and confirm the final payment. Transactions are processed in the cloud and the vendor must use the Square Payment system to process payments. Some drawbacks are that GPS isn't as exact as other technologies so the picture of non-customers with square wallet passing by, or standing outside, often show up on the vendors screen and many point of sale devices do not have the capability to display the customers photo. Square, therefore, recommends that their service be used with an IPad, tablet, or PC.

LevelUp has also made some headway in the mobile wallet industry Like the other mobile wallet providers, LevelUp requires you to download and install a Mobile Application or Mobile App. The LevelUp Mobil App creates a Quick Response Code (QR Code) on the customer's mobile device that a reader at the vendor's point of sale device scans. Payment is then processed in the cloud using the LevelUp payment system. LevelUp requires vendors to purchase a reader, which is typically connected to the vendor's point of sale terminal.

Except for PayPal, all of the mobile wallet providers detailed here provide some form of loyalty card management from the customer's mobile wallet. They all, including PayPal, also offer payment history data from the customer's mobile device. Many of the other mobile wallet providers also provide loyalty card management and payment history.

However, despite a promising future, adoption of digital/mobile wallet services by consumers has, in general, been disappointing to date. Customers haven't found any significant benefit to paying with their mobile device rather than their credit card and with the digital/mobile wallet market so fragmented, vendors are reluctant to invest in expensive technology changes. A notable exception is Starbucks, whose customers are the largest users of a mobile payment system. The Starbucks App allows customers to pay for their purchase using their mobile device. However, while the model used by the Starbucks App is most similar to the LevelUp model, in August of 2012, Starbucks invested $25 million in Squareup and is incorporating the Square Wallet into their stores' payment process.

Fear of fraud partly explains the lack of adoption of easier payment methods. In 2009, U.S. losses due to credit card fraud amounted to $190 billion for merchants, $11 billion for banks, and $4.8 billion for consumers. The United States statistics represent approximately 46% of the worldwide problem, which amounts to approximately $450 billion. In order to minimize credit card fraud in face to face transactions, Europay Mastercard & Visa (EMV) technology was developed, which uses a chip on the customer's credit card, rather than the traditional magnetic strip, to transmit information to the vendor's point of sale device. The chip technology is considered much safer because it is much more difficult to copy than a magnetic strip. While this technology has been widely adopted in Europe, the United States has yet to adopt this technology due to the massive investment it requires to retrofit ATM's and point of sale equipment.

Scanner Technology: Several companies have developed scanner technology that allows mobile device cameras to scan barcodes and QR Codes. RedLaser, which was bought by eBay in 2010, has leading technology. This technology has resulted in a new consumer phenomenon called showrooming. Many customers will visit stores like Best Buy, look through their product selection and ask the salesperson's advice, and then, once they decide which product they want, scan the barcode to instantaneously find the lowest price online and at other nearby stores. The shopper can then either negotiate a lower price with the vendor or leave and purchase the product elsewhere. RedLaser provides the customer with both eBay product listings and local store listings, whereas other Mobile Apps provide competitive online listings, including eBay, and local listings.

Webcams and cameras on mobile devices have also led to a new entry to the online payment sector for mobile devices. Jumio launched Netswipe in 2011, which uses a computer's webcam to take a picture of your card. The software application would then read the card number etc. and transmit the number, in an encrypted format, to the online store from which the customer was shopping. The software application also provided the online store with other information necessary to complete the transaction such as the customers billing address. The basic concept is that the camera is essentially a digital version of a traditional card swiping machine.

In January of 2013, Jumio launched a mobile version of Netswipe, which works in a similar fashion as the previous version except that the camera is on a customer's mobile device and uses a Mobile App. In addition to credit cards, Netswipe can also read other credentials, such as drivers licenses and passports, and digitize the content from those documents.

Self-Checkout: Many retail stores now offer self-checkout. In fact, in some markets, retailers such as pharmacies are now primarily self-checkout retailers. Self-checkout requires customers to scan and bag their purchases at a point of sale device. A natural extension of this feature is the portable scanner. Some businesses, primarily grocery stores, provide customers portable scanners that enable customers to scan and bag items as they shop. Once done shopping, the customers go to a point of sale device, docks the scanner, and downloads the data into the system. Then payment occurs. To deter theft, the stores employ an audit process wherein every so often, the vendor's security personal will check a random customer's receipt against the items with which they are leaving the store.

In addition to the foregoing, outsourcing often provides a unique business environment where many vendors, often opaque to the customer, operate in the same physical location. For example, a stadium or hospital may have several independent entities operating within, our near, their facilities. In the case of a stadium, it may have an independent company operating its parking lots and valet service, several sports teams that utilize the facility may have pro shops in the facility, several kiosks operated by businesses such as Dunkin Donuts and McDonalds may offer food in the lobby, and an independent foodservice company, such as Centerplate, Aramark, or Delaware North, may provide concession services to customers attending an event.

A hospital may also have several vendors operating within, or near, their facility. These include various medical groups, parking/valet service providers, and foodservice vendors. Each of these vendors generally utilizes their own point of sale and payment systems. Similarly, the typical mall, although more transparent, has many different businesses within its walls, each utilizing their own point of sale or payment systems.

It is also important to note that many events, such as professional and college sports, have substantially broader television, radio, and digital media audiences (the "Offsite Audiences") than the number of fans actually attending the event. And in some cases, live and or taped television, radio, and digital media events such as the Price is Right, Dancing with the Stars, NCIS, and the Jay Leno Show are produced for a television audience and they have a relatively small, if any, live audience (all inclusive "Broadcast Events"). Although, social media such as Twitter and texting capabilities have recently enabled increased communications between the producers of these Broadcast Events and fans, commerce between these producers and fans is primarily done by advertising third party goods and services to the fan viewer, who can then go online or visit a store to purchase any such goods and services.

SUMMARY OF THE INVENTION

In view of the above, a need exists for systems and methods that quickly and easily provides consumers with the ability to attend to payment and otherwise purchase goods and services. The improved systems and methods would also reduce fraud and create a high level of consumer and vendor confidence.

The present disclosure is directed to a method and apparatus for increasing commerce and profitability by improving customer service resulting from faster order processing and delivery of goods and services, reduced queue times, and increased order accuracy. The order processing and other transactional costs are also reduced. Cyber security is increased by providing a more secure environment and process for digital payments. Still further, the ability of businesses to interact with their customers is improved.

The method and apparatus would have applications at any establishment, profit or non-profit, wherein commerce takes place. Stadium events such as sports and concerts, hospitals, restaurants, malls, grocery stores and automated teller machines as well as online stores in cyberspace are particularly well-suited for application of the subject technology.

In one embodiment, the method and apparatus utilizes the global positioning system (GPS) and a customer's personal communications device (e.g., personal computer, smartphone, tablet etc.) (PCD) to recognize where a customer, who is enrolled in the network, is physically located. Menus for goods and services from a plurality of vendors at that location, or affiliated with that location, are delivered to the PCD. The vendors are also enrolled in the network.

In another embodiment, the customer may enter a code to create a virtual presence at a location. While connected to the location, customers will be able to use the menus delivered to their PCD, as well as other technology delivered to their PCD, to order goods and services from the vendors servicing that location. The customer will then be able to pay for any such goods and services by utilizing their PCD, and then either pickup any such goods and services in person, have them delivered to their seat, home, business, or other physical location, or have them downloaded to their PCD, if applicable.

Preferably, the subject technology uses a centralized payment system to process the transactions and remit the funds to the vendor or, alternatively, provide the vendor's gateway with the payment information necessary to process the payment utilizing the vendor's merchant account. In either case, the vendor never receives any confidential payment information. The payment processing and other features of the method and apparatus provide increased cyber security by: 1. establishing a secure and verifiable connection between the PCD of enrolled customers and the payment network; and 2. transferring order data from enrolled vendors to the payment network rather than payment information to the vendor. As a result, the need for enrolled customers to ever provide enrolled vendors with any confidential payment information is alleviated. Accordingly, vendors do not store any of the enrolled customers' confidential payment information.

By moving the point of sale to the PCD, and thus making the sale mobile, new services become available to customers. The method and apparatus has applications in both the traditional brick and mortar retail environment and the online shopping environment. Furthermore, the method and apparatus also improves the ability of enrolled vendors and enrolled customers, including, but not limited to, celebrities (e.g. athletes, rock stars, sports teams) to communicate, especially during ongoing events, which enables them to transact in commerce in a new and dynamic way.

In one embodiment, the subject technology is directed to a server for facilitating commerce. The server communicates with clients via a distributed computing network. The server includes a memory storing an instruction set, customer data related to a plurality of customers, vendor data related to a plurality of vendors, venue data related to a pluarlity of venues, and server data related to an entity sponsoring the server. A processor is in communication with the memory for running the instruction set. The processor is also in communication with the distributed computing network. The processor is operative to: provide a portion of the vendor data to a first client of a first customer based upon the client entering a venue, wherein the portion of the vendor data relates to the venue; receive an order for a product of a first vendor from the client, wherein the product is included in the portion of the vendor data; provide the order to a second client of the vendor so the vendor can fill the order; attend to collection of funds in payment for the order from the first customer by using a portion of the customer data; and attend to payment of funds for the order to the vendor by using a portion of the server data.

It should be appreciated that the subject technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the follow drawings.

DETAILED DESCRIPTION OF PREFERRED EMBODIMENTS

The subject technology overcomes many of the prior art problems associated with payment for goods and services. The subject technology bridges the gap between the realm of a physical presence at a venue where vendors provide goods and services and the digital relationship with those vendors. The method and apparatus of the present disclosure relate to electronic order processing, digital payments and cyber security, as well as scheduling and delivery of goods and services, and communications between vendors and customers in both face-to-face and online transactions.

The advantages, and other features of the systems and methods disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

DEFINITIONS

A computer or server is one or more digital data processing devices used in connection with various embodiments of the invention. Such a device generally can be a personal computer, computer workstation (e.g., Sun, HP), laptop computer, a tablet computer, server computer, mainframe computer, handheld device (e.g., personal digital assistant, Pocket PC, cellular telephone, etc.), information appliance, printed circuit board with components or any other type of generic or special-purpose, processor-controlled device capable of receiving, processing, displaying, and/or transmitting digital data. A typical computer includes random access memory (RAM), mechanisms and structures for performing I/O operations, a storage medium such as a magnetic hard disk drive(s), and an operating system (e.g., software) for execution on the central processing unit. The computer also has input and output devices such as a keyboard and monitor, respectively.

A processor generally is logic circuitry that responds to and processes instructions that drive a computer and can include, without limitation, a central processing unit, an arithmetic logic unit, an application specific integrated circuit, a task engine, and/or any combinations, arrangements, or multiples thereof.

Software or code generally refers to computer instructions which, when executed on one or more digital data processing devices, cause interactions with operating parameters, sequence data/parameters, database entries, network connection parameters/data, variables, constants, software libraries, and/or any other elements needed for the proper execution of the instructions, within an execution environment in memory of the digital data processing device(s).

A module is a functional aspect, which may include software and/or hardware. Typically, a module encompasses the necessary components to accomplish a task. It is envisioned that the same hardware could implement a plurality of modules and portions of such hardware being available as needed to accomplish the task. Those of ordinary skill will recognize that the software and various processes discussed herein are merely exemplary of the functionality performed by the disclosed technology and thus such processes and/or their equivalents may be implemented in commercial embodiments in various combinations without materially affecting the operation of the disclosed technology.

Figure 1:
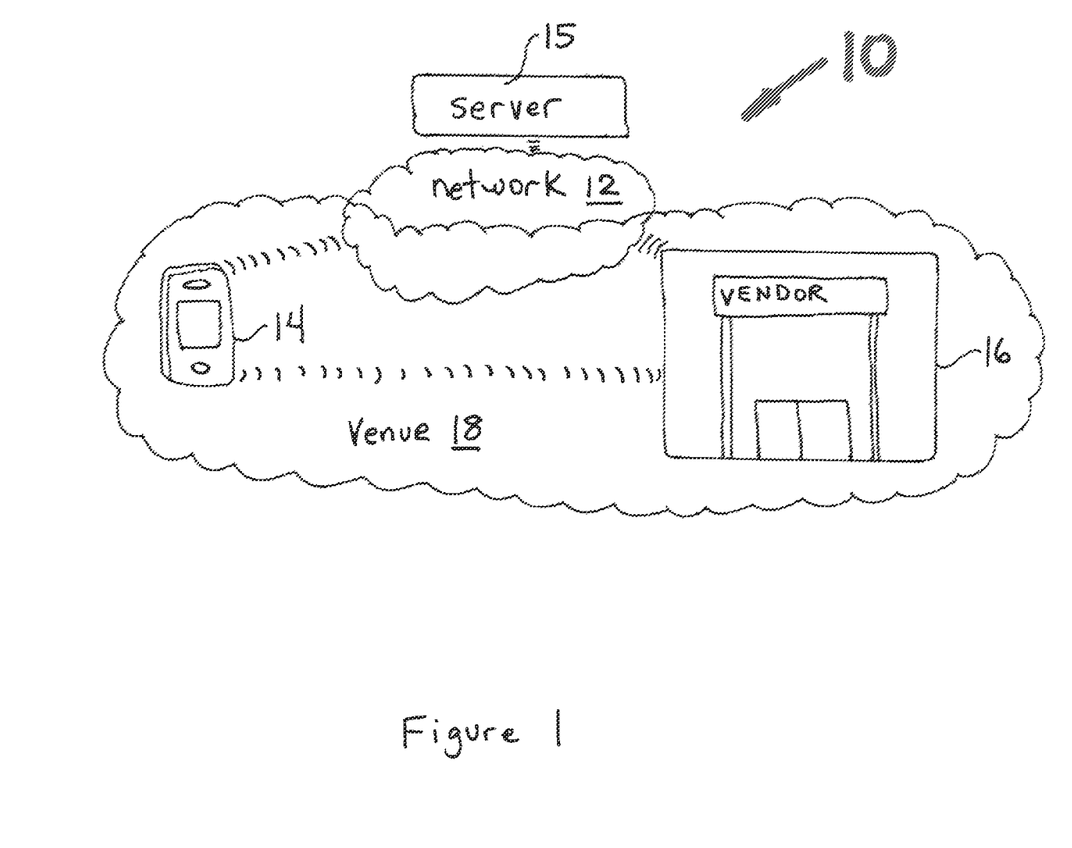
FIG. 1 is a diagram showing an environment having a transaction system in accordance with the subject disclosure.

Referring now to FIG. 1, there is shown a block diagram of a transaction system 10 with digital data processing devices embodying and implementing the methodology of the present disclosure. The transaction system 10 connects the primary elements of the business transaction together via a network 12. Customers interact with the network 12 by using their PCDs 14. An entity that hosts the transaction system 10 has a host entity server 15 connected to the network 12. Vendors 16 interact with the network 12 using a client computer or other suitable device. For simplicity, only a single customer PCD 14, host entity server 15 and vendor 16 are shown. In one embodiment, the customers 14 and vendors 16 are at the same the venue 18 for a particular event such as a stadium for a professional sports game but the host entity server is located remotely.

The transaction system 10 is user-interactive and may be self-contained so that users need not leave to another virtual address within the distributed computing network 12 to access various information. The following discussion describes the structure of such a transaction system 10 but further discussion of the applications programs and data that embody the methodology of the present invention is described elsewhere herein.

Preferably, the PCDs 14 and vendors 16 interact with each other on the network 12 via software, including an application program interface (API), a software application for personal computers and other similar PCDs 14, and a Mobile App, for PCDs 14 that are mobile devices. Although the hosting entity is involved in transactions, such involvement is preferably transparent to the customers and vendors except for possibly some branding or other certification indicia displayed during the process. A customer in the transaction system 10 is anyone or any entity contemplating or intent on making a purchase. A vendor 16, as represented graphically by a traditional building even though on the Network, is anyone or any entity intent on selling goods and services and using a digital processing device to access the network 12. A venue 18 is any location where a transaction may occur, which includes, but is not limited to, a stadium, movie theater, hospital, mall, restaurant, grocery store, automated teller machine (ATM) or online store in cyberspace. An event is typically an activity associated with the venue at a particular time when any such transactions may occur. Events include, but are not limited to, a sporting event, a visit to the hospital, going to a restaurant, shopping at grocery store, or visiting an ATM machine, or shopping on the Internet.

The transaction system 10 includes one or more servers that are distributed as needed to employ the subject technology. The communication channels can be wired or wireless as is well known to those of ordinary skill in the pertinent art. For simplicity, only wireless channels amongst the network, PCD 14, host entity server 15, and vendor 16 are shown. The host entity server 15 hosts multiple Web sites and house multiple databases necessary for the proper operation of the transaction system 10 in accordance with the subject technology. It is envisioned that all the digital processing devices (e.g., servers, smartphones, desktop computers etc.) of the transaction system 10 could be the same device simply programmed for different functionality or different hardware for each, more suitable to the particular purpose, could be used.

Still referring to FIG. 1, the distributed computer network 12 may include any number of network systems well known to those skilled in the art. For example, distributed computer network 12 may be a combination of local area networks (LAN), wide area networks (WAN), or a single private network, as is well known. For the Internet, the preferred method of accessing information is the World Wide Web because navigation is intuitive and does not require technical knowledge. As is known to those of ordinary skill, the network 12 can be a series of network nodes (each node being a digital data processing device, for example) that can be interconnected by network devices and communication lines (e.g., public carrier lines, private lines, satellite lines, etc.) that enable the network nodes to communicate. The transfer of data (e.g., messages) between network nodes can be facilitated by network devices such as routers, switches, multiplexers, bridges, gateways, etc. that can manipulate and/or route data from an originating node to a destination node regardless of any dissimilarities in the network topology (e.g., bus, star, token ring, etc.), spatial distance (local, metropolitan, wide area network, etc.), transmission technology (e.g., TCP/IP, Systems Network Architecture, etc.), data type (e.g., data, voice, video, multimedia, etc.), nature of connection (e.g., switched, non-switched, dial-up, dedicated, virtual, etc.), and/or physical link (e.g., optical fiber, coaxial cable, twisted pair, wireless, etc.) between the originating and destination network nodes.

The transaction system 10 also includes PCDs 14, host entity servers 15 and vendors 16, which can be considered as network client devices such as desktop computers, laptop computers, personal digital assistants, cellular telephones, servers and the like. Typically, the clients of customers and entities looking to sell goods and services allow such users to access information on the servers of the network 12. A plurality of users can utilize the transaction system 10 simultaneously. Although a simplified diagram is illustrated in FIG. 1 such illustration shall not be construed as limiting the present invention to the illustrated embodiment.

The client devices are preferably equipped with an input devices and display devices as is known to those skilled in the art which can be used to provide input signals for control of applications programs and other programs such as the operating system being executed on the clients.

Figure 2:
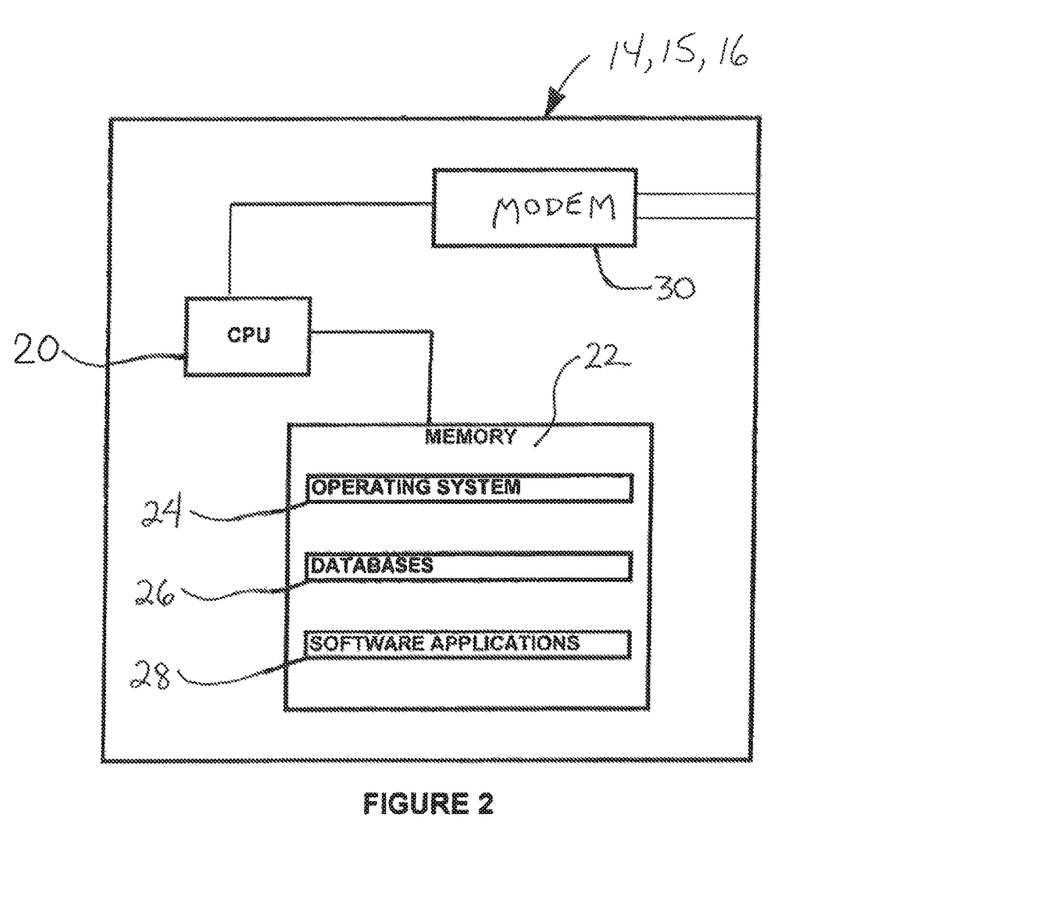
FIG. 2 is a block diagram of a digital processing device for use in the transaction system of the subject disclosure.

Referring now to FIG. 2, as illustration, a general configuration for the digital processing devices of the transaction system 10 (e.g., PCD 14, server 15, clients of the vendors 16, and servers of the network 12) is shown. Typically, the digital processing devices include a central processing unit (CPU) 20 including one or more microprocessors such as those manufactured by Intel or AMD in communication with access memory 22 (e.g., RAM) along with mechanisms and structures for performing I/O operations (not shown). The memory 22 also includes a storage medium such as a magnetic hard disk drive(s). The memory 22 stores an operating system 24 for execution on the CPU 20. The memory 22 is used for storing data in databases 26 and client applications 28. The memory 22 also provides booting and other applications that are to be executed by the CPU 20. In one embodiment, the application programs reside on the memory 22 for performing the functions in accordance with the transaction system 10. The memory 22 also has a browser for accessing applications hosted within the distributed computing network 12. The digital processing devices can also utilize a removable computer readable medium such as a CD or DVD type of media that is inserted therein for reading from and/or writing to the removable computer readable media.

The flow charts herein illustrate the structure or the logic of the present technology, possibly as embodied in computer program software for execution on a computer, digital processor or microprocessor. Those skilled in the art will appreciate that the flow charts illustrate the structures of the computer program code elements, including logic circuits on an integrated circuit, that function according to the present technology. As such, the present technology may be practiced by a machine component that renders the program code elements in a form that instructs a digital processing apparatus (e.g., computer) to perform a sequence of function step(s) corresponding to those shown in the flow charts.

Figure 3:
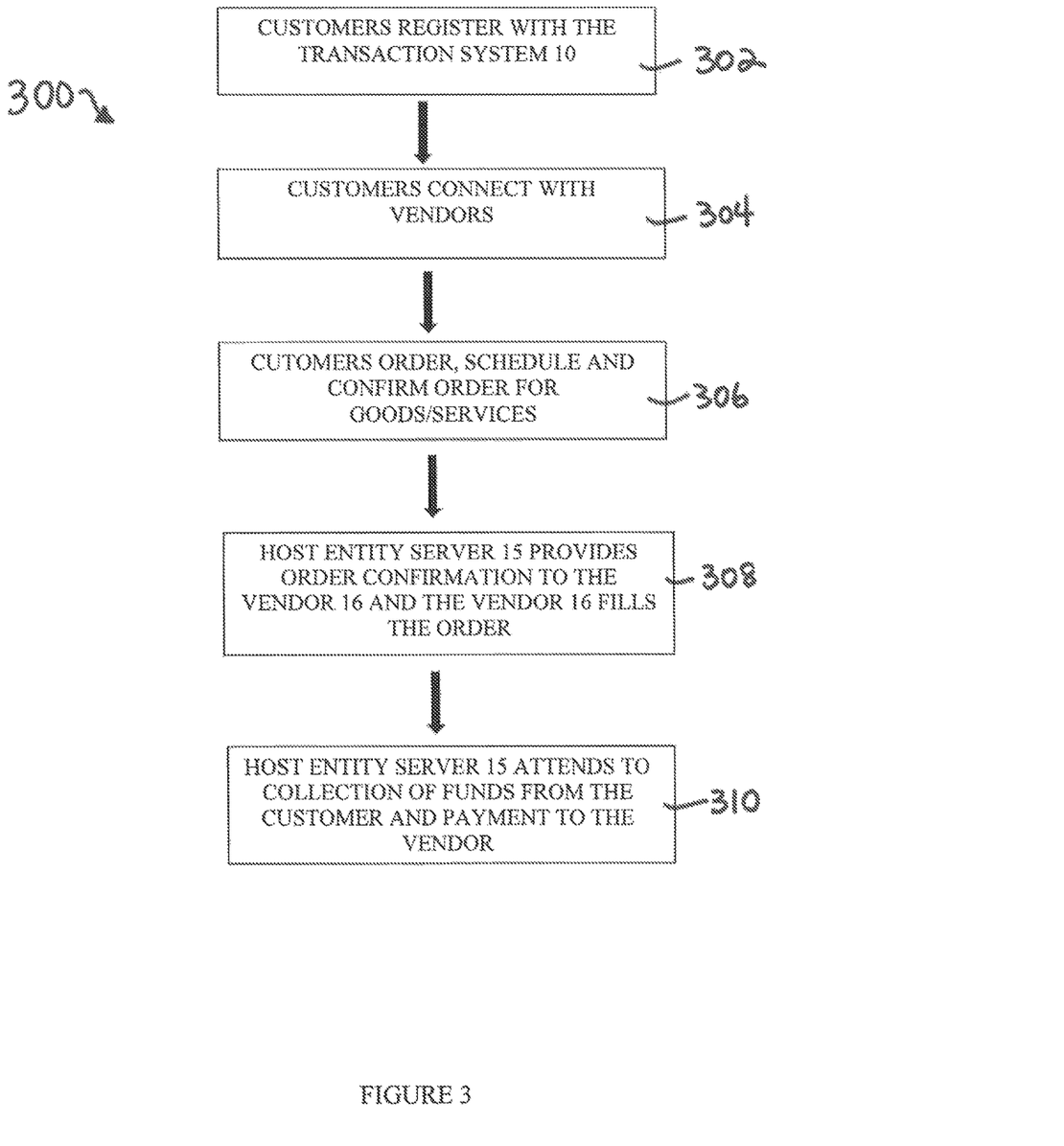
FIG. 3 is a flow diagram of a process performed by the transaction system of FIG. 2.

Referring now to FIG. 3, there is illustrated a process 300 for facilitating commerce between customers and vendors 16 in accordance with embodiments of the present technology. In brief overview, the subject technology allows the customer's mobile device, or other PCD 14, to become the point of sale terminal for sales. The customer does not interface with the vendor's physical point of sale equipment. Thus, no payment information is transferred to or accessed by the vendor. In fact, 100% adoption by customers of a vendor 16 would completely eliminate the need for the vendor 16 to have a physical point of sale device or a point of sale. The subject technology is equally applicable to both face-to-face transactions as virtual transactions.

At step 302, the process 300 starts by having the customers register to use the transaction system 10. For a smartphone PCD 14, the customers would download a Mobile App, preferably without charge. In an online Internet alternative, the customers would utilize a desktop or laptop PCD 14 for registration. The information for registration could include at least one credit card and related payment information, one or more shipping addresses (e.g. home, business) and information about the make, type, color, and registration number of any vehicles to be associated with the account. This registration information would be stored in the database 26 of the memory 22 of the host entity server 15 of the transaction system 10. Similarly, vendors 16 register with the transaction system 10. It is envisioned that the vendors 16 would pay a subscription fee to the entity hosting the transaction system 10. However, certain customers and certain vendors could be required to pay subscription fees to the host entity or have access for free depending upon circumstances. The host entity could also collect revenue based on a percentage of sales from the vendors 16 and the like.

At step 304, registered customers connect to any physical or online location of any of the vendors 16 utilizing a software application or Mobile App on their PCD 14. The connection may be automatically activated when an enrolled customer is physically at an enrolled vendor's location. Alternatively, the customer may connect their PCD 14 to the vendor 16 from anywhere by entering a vendor code. Similarly, the customer may automatically connect with one or more vendors by being at an event or entering an event code.

At step 306, after connection, the customer is able to utilize their PCD 14 to order, schedule, and pay for the vendor's goods and/or services. The customer is able to select from goods and services that the vendor 16 has for sale at the venue 18 and/or event by review of a standardized menu structure on the customer's PCD 14. Instead of sending the customer's payment information to the vendor 16, the vendor sends information about their goods and services to the customer through the network 12. The information about the vendor's goods and services may be stored on the host entity server 15 for subsequent display on the customer's PCD 14.

Once the goods and/or services are selected, the customer then checks out by authorizing payment using their PCD 14 and communicating with the host entity server 15. As a result, the point of sale has moved from the vendor 16 to between the customer's PCD 14 and the host entity server 15. At step 308, the host entity server 15 provides notice to the vendor 16 regarding order information and payment confirmation. The vendor 16 only needs to deliver the selected good and/or services with payment forthcoming from the host entity. Preferably, the host entity has pre-negotiated a discount with the vendors 16. The discount may be passed on to the customers in whole or in part. The payment could also proceed by the customer using their PCD 14 to provide payment information directly to the vendor 16. At step 310, the host entity attends to collection of the necessary funds from the customer (e.g., by charging the customer's credit card) and payment to the vendor 16.

To further illustrated the advantages of subject technology, several examples of how the subject technology would be used at different venues and events is explained below.

Football Game: A fan attending a football game would begin by driving up to the parking lot of the stadium where if he or she hasn't already logged in, the fan's mobile device will recognize the venue 18 and turn on the associated Mobile App. The fan logs into the Mobile App by providing a PIN. The fan also selects whether he or she wants to attend the event publicly or privately using their PCD 14. If attending publicly, the Mobile App identify other friends attending the event publicly. The Mobile App may find friends by searching the fans Facebook or other social media account, reviewing the contact list stored in the PCD 16, and/or reviewing a friends list stored at the host entity server 15. The Mobile App will also allow fans attending publicly to communicate with each other through the network 12.

While at the venue 18, the fan remains signed in to the transaction system 10. The fan may pay, without additional security, for the entire event after the initial sign-in. The Mobile App retrieves event specific data from every vendor on the network 12 and provides the event specific data to the fan's PCD 14.

For example, as the fan drives into the stadium parking lot and their PCD 14 is recognized by the transaction system 10 as being present, the fan can select parking from the event menu on their PCD 14 and the parking fee appears. The fan can easily select a pay parking bottom and the parking is paid for with confirmation provided to the PCD 14 and vendor 16 in charge of parking. If the parking lot is gated, the transaction occurs at the gate and the gate, as identified by a gate number or recognized by GPS of the PCD 14, will then lift and the fan can park. For attendant parking, the PCD 14 can also be provided with notification that is shown to the attendant.

In another scenario, through the network 12, the host entity server 15 prompts the fan to enter a parking spot number via their PCD 14 and attends to payment. In another scenario, the fan decides to valet their car. When the fan pulls up to the valet, the fan can use their PCD 14 to scan the QR Code, manually enter the number, or scan the barcode on the ticket that the valet attaches to the fans car keys. Based upon the information stored in the host entity server 15 about the vehicle, the parking garage and the valet service will know the description and registration number of the car and its location. Then, the host entity attends to payment of the valet service and collection of funds for same from the fan.

Still referring to the football example, prior to entering the stadium at the venue 18, or even at home, if the ticket is a paper ticket, the fan can scan or manually enter their seat location into the Mobile App using their PCD 14. If the ticket is an e-ticket delivered to the PCD 14, the Mobile App will be able to automatically enter this information. Once entered, selecting directions will provide the fan directions to their seat using the PCD 14. Along the way, the fan may stop at any of the various vendors 16 in the concourse. Desired items can be scanned with the PCD 14 or selected the items from the menu on the Mobile App. In another scenario, the vendor may scan or enter the items into their terminal and the items will appear on the PCD 14 of every fan who reviews the vendor's menu. Once the order is complete, the fan simply selects a pay button and confirms the amount to pay the vendor 16. The host entity server 15 sends a paid code to a network interface available to the vendor 16 so that the fan is provided with the goods and/or services. Again, the host entity attends to collection of funds from the fan and payment to the vendor 16.

Once the fan is seated at the game, their PCD 14 can be used to review the food and beverage options offered by stadium concession vendors 16 and place an order. The fan can then choose to pick up the order or have the order delivered if available. If the fan chooses to pick up their order, their PCD 14 is provided with a ready time and directions to the concession stand fulfilling the order. As can be seen, a benefit of the process 300 is moving the point of sale to the fans seat to alleviate lines at the concession stand. The process 300 also makes delivery more efficient rather than simply having concessionaires roaming up and down the aisles yelling out their offerings. The process 300 also allows the fans to conduct transactions from their seat to vendors in the concourse so that enjoyment of the event can be maximized.

Still referring to the football example, each purchase on the network 12 can have an order number and a random confirmation number. When delivery occurs, either at a counter or at the fans seat, the vendor 16 filling the order can identify the customer by asking the order number and the person can confirm by providing the confirmation number or showing such a number or confirmation barcode on their PCD 14 for scanning by the vendor 16. The network 12 would also let the fan know how soon to pick up the order if the fan is picking it up in person.

During a break in the action, the fan may peruse the items for sale at the team pro shop on the Mobile App, and purchase some T-shirts, posters, or other memorabilia. The fan could then choose to have the items delivered to their seat if the pro shop offers such delivery, pick the items up following the game, or to have them delivered to a postal address (e.g., home or office). Once the order is complete, the PCD 14 is used to select a pay button, and then confirms the amount over the network 12 to the host entity server 15. Then, the vendor 16 attends to filling the order and the host entity server 15 attends to collection of funds from the customer and payment to the vendor. If the fan chose to pick up their purchase after the game, the host entity server 15 sends a message to their PCD 14 at the end of the game to remind the customer to pick up the package. Preferably, directions or access to directions from the customer's location to the pro shop are provided with the post-game reminder. Through the network 12 or via satellite and the PCD, the host entity server 15 would also monitor the fans location during the game and continue to remind the fan that they have a package to pick up. If it appears that the fan is leaving the venue 18 early, without their purchase, the host entity server 15 would prompt the fan to remember their purchase and required pick up.

During another break in the football game, the fan could respond to special offers on the stadium super large screen closed circuit television or sent directly to the Mobile App on their PCD 14, such as entering the team charity's 50/50 raffle or selecting a one click purchase option for a dvd of the game to be sent to their home for a specific price. The fans could also respond to fan surveys through the network 12 and stored in the host entity server 15 by using their PCDs 14. Surveys could relate to the game, promotions designed to keep fans engaged, venue facilities and the like. The fan would also have the ability to see if any of his or her friends are attending the game publicly on the network 12 and buy their friend's food or drinks that would be delivered to their friend's seat.

When the fan is leaving the stadium, selection of a departure button on the PCD 12 would notify the valet that the fan is on the way so that the car can be ready when the fan arrives. From the valet perspective, the host entity server 15 could indicate how far each fan requesting a vehicle is from the valet to allow ordering service of them based on who is likely to arrive first. Alternatively, the network 12 could provide the fan with directions to their car in the parking lot. The fan could also use his or her mobile device to give the valet, or any other service provider a tip. If the car itself is network enabled, the fan could use their PCD 14 to start the engine, climate control systems, heated seats and the like through the connection of the venue 18 to the network 12.

Additional Mobile App features, applicable to this example and others, would allow the fan to set a budget by category or in total before the event and the Mobile App would let them know when they are near or going over their budget.

Offsite Audiences: An Offsite Audience fan could be, for example, at home watching on television, in a sports bar, or in a hospital bed etc. The Offsite Audience fan can be listening on the radio to the football game described above or any other broadcast event, live or on delay. Using their PCD 14, the Offsite Audience fan can log into the respective event using an event code. The Mobile App on the PCD 14 would display similar menus that are modified for offsite use from the host entity server 15. For example, the foodservice would not be available for delivery, but the fan could still order food and drinks for delivery to a friend attending a Broadcast Event publicly. Alternative local food vendors 16 that do deliver to the Offsite Audience fan would be shown. The Offsite Audience fan could order from the pro shop for shipment to the fans home or office, or enter the 50/50 raffle. The Offsite Audience fan could also respond to special offers or surveys broadcast to them or sent to them via the network 12. Some of these special offers could be coupons from advertisers or to use their Network interface with restaurants such as Dominos, for example, to take advantage of a special discount offered to fans watching a specific Broadcast Event.

Fast Food Restaurants: Fast Food restaurants would also be able to advantageously deploy the subject technology. The customer could log into the restaurant using the Mobile App on their PCD 14. The PCD 14 could place and pay for their order when near the restaurant or, for example, sitting in a nearby park. The host entity server 15 would subsequently collect funds from the customer and attend to payment of the vendor 16. The customer could also order from home or work using their personal computer or other PCD and place an order for later pickup or delivery if the restaurant offers delivery. Alternatively, when the customer enters the restaurant, the customer can sit down at a table, order their food, and pay with a request for table service if it is provided.

The customer could also order the food verbally at the counter. As the order is entered by the vendor 16, the order would appear in the Mobile App on their PCD 14. The customer could then confirm the order and pay with their PCD 14. The process would be similar when using the restaurant's drive through as well. Additionally several friends registered with the host entity server 15 and logged in publicly, that are visiting the restaurant together, could create separate orders or one order and split the bill.

Fine Dining: An important part of the fine dining experience is the service. Customers could order from their table using the Mobile App on their PCD 14 rather than wait for a waiter/waitress to take the order. Also, the ordering could still be done in a more traditional manner in that the waiter could take the order. As the waiter enters the order into the restaurants order system, the order appears in the Mobil App the same as if the customer had added the order. When the night was over, the customer can enter a tip and select pay using the host entity server 15 to later process the funding of the transaction. Again, waiter delay is avoided and efficiency increased. The customer could also split the bill with others in their party who are registered in with the host entity server 15.

Hospitals: When visiting a hospital for a doctor's visit or to have tests done, most of the Mobile App features would be similar to going to a stadium. Like a stadium, the hospital has multiple vendors including different medical practices, parking/valet services, flower shops, restaurants, and cafeteria services. With respect to these vendors, the application of the subject technology would essentially be the same as visiting a sports stadium. However, within this specialized environment, the Subject technology would also offer additional features.

Once a patient at the hospital (e.g., venue 18) logs into the network 12, the Mobile App would be able to tell the patient if his or her doctor was running behind. The host entity server 15 would also tell the doctor's administrators when the patient arrived to facilitate check-in. If the doctor is running an hour behind, instead of sitting in the office, the patient could go and get a cup of coffee and work, shop in the gift shop, or sit in the garden. As the time got closer to the actual time of the exam, the network 12 would provide information to the PCD 14 in time for the patient to to to the office.

Once done with the exam, the patient could check out and pay his or her copay with the Mobil App. If the doctor told the patient to go for a blood test, or some other test, before they left the hospital, the location of that lab would be sent to the Mobile App so that the patient could find his or her way there. The patient could also check into the lab from the Mobile App to get into the queue for those lab services and find out the wait time at that lab. If the wait time was an hour, the patient could go for more coffee and do some work, and then head up to the lab when notified it is almost their turn. Also, upon leaving the doctor, if the patients next appointment was scheduled the Mobile App would record that appointment on the Network and enter it into the patient's appointment book. Similar to the stadium example, the patient could order food from their PCD 14 and the transaction system 10 could keep dietary restrictions and the like in compliance. The transaction system 10 could also provide reminders to take medicine and the like at appropriate times.

Online Shopping: Instead of connecting to an online vendor such as Barnes & Noble's directly, the subject technology creates a gateway that the customer accesses by logging in to the Mobile App or the software application on their personal computer or other similar PCD 14. After login in, the the customer would access the Web site of a participating vendor through a portal presented by the host entity server 15 to create a secure virtual private network between the customer and the vendor's Web site.

Next the customer would shop utilizing the vendor's Web site, adding items to their cart in a typical manner. When the customer finished and selected checkout, instead of the vendor's shopping cart, a shopping cart of the host entity server 15 would appear with the selected items. The customer could then make changes going back and forth between the vendor's Web site and the host entity server shopping cart until the host entity server shopping cart reflected the desired order. The customer would then select pay and confirm the amount to pay for the order. The payment confirmation would be sent to the vendor 16 along with delivery addresses so that the vendor 16 could fulfill the order. Then the host entity would attend to collecting funds from the customer and providing payment to the vendor 16.

Additional features would be saving frequently visited vendors and favorite orders, so if the customer buys a coffee from the Starbucks on the corner of their office building every morning, the customer can set it up so that as they select a button on their PCD 14, when the customer is a block or so away, the order is ready for when the customer arrives. It is also envisioned that the host entity may have even provided payment to Starbucks in realtime with the order for subsequent collection of funds from the customer. Moreover, with all of the customers detailed purchase information available on the host entity server 15, the subject technology enables customers, vendors, and manufacturers to interact in numerous ways to deal with warranty issues, coupons, loyalty cards and other related communications.

Payment Information: The host entity server 15 stores the customer's payment information so that none of the payment information is stored on the mobile device, personal computer, or any other PCD 14. The customer may add one or more credit cards when setting up the account with the host entity for storage on the host entity server 15 and afterwards.

The customer may also create a cash bank by providing debit information and having funds drawn from his or her account into a host entity account. When the customer approves a payment, the customer may choose from which method to make the payment, debit or credit. The customer would also have the ability to select one card as a default card with the ability to switch to secondary cards as desired.

When the payment is approved, the host entity server 15 would send the payment information to either the host entity gateway or to the vendor's gateway depending on how the account was set up with the vendor 16. If the customer is paying cash, the host entity server 15 will confirm that the customer has the cash available in their account and send payment to the vendor's account. The system will enable the vendor to offer cash discounts and customers will be able to utilize loyalty programs and coupons when paying for goods and services.

Security: The host entity server 15 contains numerous security measures to prevent fraud and misuse. To begin with, the subject technology has all of the customer's payment information stored in a single place, namely the host entity server 15. Thus, it is easier, safer, and more cost effective to secure the host entity server 15 as compared to other systems in which such information is distributed. For example, each time a customer uses their credit card online or in a store, the risk of credit card fraud increases because the vendor and employees of the vendor receive payment information that by definition can be used to pay for goods and services.

The subject technology completely eliminates the risk associated with passing credit information to vendors 16 by, for example, aggregating payments and/or providing wire transfers. As a result, the vendor does not receive any information of the customer that can effect a payment or be stolen. Instead the vendor 16 provides the host entity server 15 with publically available goods and services information. The host entity server 15 deals with the credit card gateway. Moreover, since the information passing from the vendor to the host entity server 15 as well as from the customer to the host entity server 15 is only publically available product information, such information can be transmitted on unsecure channels allowing for easier operation.

On the PCD level, all devices connected to the internet have a unique Media Access Control Address (MAC Address). In addition to a MAC Address, smartphones and other mobile devices each have both a unique Subscriber Identification Module (SIM) and a unique International Mobile Equipment Identity. Using any one or all of these features, as well as the serial numbers of the mother board and certain other components on a PC, the host entity server 15 establishes a secure profile for each customer and each device the customer registers on the host entity server 15. As a result, the host entity server 15 will only process orders from one of these registered devices. Also, although not overly onerous, the original set up process would be thorough enough to effectively confirm the identity of the subscriber.

Once a device is activated on the transaction system 10, certain basic security will be required to process transactions. For example, the most time the customer would be able to remain logged into the Mobile App would be predetermined, such as 24 hours. To use the Mobile App again after 24 hours, the customer would need to re-enter his or her (PIN) again. The host entity server 15 would also have the capability of functioning with either a fixed PIN or a onetime only PIN features and the host entity server 15 could use either one of these or both depending on the circumstances.

Other security features would be based on the customer's needs and usage. Security measures could range from simply entering their PIN to biometrics such as scanning their finger or retina. Some security measures would be triggered based on usage. For example the customer would be able to set a security setting so that he or she could spend up to a certain dollar amount a day, without logging in, for example not to exceed $25.00 in any given day. This would allow for the purchase of coffee and lunch without needing to log in each time.

While the amounts provided here are for example purposes only, other security features would include dollar thresholds, the customer needs to enter their PIN for any transaction over $250, and they may need to enter a onetime only PIN sent to them by text for a purchase over $500, and if over $1,000 it may require answering a security question. Vendor thresholds, if a customer shops at the Wholefoods in Boston weekly the security threshold could be less for that transaction than that for a different store, such as Best Buy, where the customer has not previously shopped.

Usage thresholds, if the customer bought $500 at Wholefoods every week on Friday and this week after that purchase he or she also bought $500 at the Star Market, where they have never shopped before, the security level may be raised for that transaction. Location testing, if the customer primarily shops in Boston and is suddenly connecting with their mobile device to a store in Maine, that transaction may require some additional security. Transaction types may also cause the security level to be raised for a transaction, for example withdrawing money from a participating ATM could require more security than purchasing fuel.

In short, the transaction system 100 learns the habits of the customers and adjusts security appropriately. It is also important to note here that if the customer fully implements the subject technology so that all of the customer's credit and debit cards are on the host entity server 15, the security would be global in nature. In other words, a criminal could not use different cards at different times to disguise abnormal behavior that might have otherwise been picked up if the same card had been used for those purchases.

Also with regard to the Internet, buy connecting to the host entity server 15, first and then connecting to the Web site, the host entity server 15 is able to verify that the connections are legitimate on the network level. The host entity server 15 can then also apply additional security rules, as necessary, to verify the user. For example if the GPS on the customer's mobile device has the customer located at home in Boston at 3:00 am and he or she is supposedly placing an order from a computer in Bulgaria, there is likely a problem.

Data and Communications: The tremendous data regarding customer purchases will enable the host entity server 15 to manage and apply loyalty cards and coupons to customer accounts. It will also enable customers to manage budgets and warranties, and reconcile detailed transaction information on purchases to their credit card statements. In fact, the transaction system 10 would enable the customer to download their credit card statement and automatically synchronize the statement to their purchases on the host entity server 15 to provide them with more detailed information about each purchase. This level of detail would facilitate creation of expense reports from the transaction system 10 without needing to store and copy receipts. Additionally, the transaction system 10 enables vendors and manufacturers to make special offers to their customers and allow customers to discuss and rate products with their friends.

As can be seen, by mobilizing the point of sale onto mobile devices, transaction security is increased and customer access to the vendors is enhanced. In turn, vendors increase commerce and profits by improving customer service, reducing transactional costs and queues, and increasing communication capabilities. Also, the level of security provided by the transaction system is not readily available to vendors because the initial setup and detail required for any one such vendor would be too cumbersome for customers if they were required to go through the necessary process every time a new vendor account was set up with any one vendor. Moreover, the security demands to retain any such security information would be daunting for most vendors, but by utilizing a single host entity to manage this data, the cost of the superior security provided by the subject technology is spread not born by each vendor.

The customer enjoys the transaction system 10 because a single device (e.g., the PCD 14) with a familiar interface (e.g., the Mobile App) can be used to procure a variety of items from a variety of vendors 16. The transaction system 10 is well-suited to the airline and hotel industry among others.

The transaction system 10 is also useful for airline and Hotel Reservations where it could manage reservations and loyalty programs from a single unified host entity. Another example of a useful application is state lotteries. State Lotteries are actively seeking legal methods for selling lottery tickets online. The transaction system 10 effectively could use GPS on the PCD 14 to limit orders to customers physically located in the state. The transaction system 10 can also have cash features that enable customers to draw cash from their bank to pay for tickets with cash. The transaction system 10 could pinpoint the location of any transaction when the tickets are purchased, so that the lottery could pay the nearest agent a commission on each sale, which, rather than cannibalizing the lottery agent's sales. The transaction system 10 could track customers purchased to identify patterns of addictive and irresponsible purchasing and prevent multiple accounts to the same person. Further, the lottery could simply set purchase limits.

In the lottery application, if a customer is physically in a state whose state lottery system is on the transaction system 10, the Mobile App would download menus for the lottery games available online from that state. The customer could then select his or her ticket numbers, or quick-pick tickets, and pay for them using one of a couple of cash payment options available to them on the transaction system 10. After processing the payment, the ticket order would be submitted to the state lottery, through an API, and digital tickets would be issued to the customer via email or the Mobil App. Paper tickets could also be picked up at a nearby vendor to which directions would be provided. It should be noted here that because the order contains the entrant's name, and other identifying information, there is no risk of having the digital tickets duplicated. In fact, because of the digital nature of the order and tickets, the lottery could also directly pay lottery winners through the transaction system 10, as well.

Still further, the subject technology can be applied to other highly sensitive documents, such as driver licenses and passports, and highly sensitive services such as online banking and person to person fund transfers, and social media. In banking, the transaction system 10 would be useful on automatic teller machines (ATMs) to prevent skimming. When the customer is at an ATM machine, the customer uses the Mobile App to check-in at that venue 18, whether it be at the bank or in a lobby etc., and confirm the ATM's number from the ATM. The mobile device's GPS features, in conjunction with the Mobile App, confirms that the PCD 14 of the customer is physically at the ATM. Moreover, several security options could be set up for this particular application. First, logging in to the Mobile App could be sufficient security to activate the ATM. The customer could also log in to the Mobile App using their ATM PIN, which may, or may not, be the same as the customer's PIN for the Mobile App, which would activate the ATM. Upon checking in to the bank from the Mobile App, and selecting the ATM, the transaction system 10 and/or the PCD 14 could connect the ATM's video camera to verify identity such as by using facial recognition capabilities by comparison to a license, or other photo, that the customer submitted when the customer set up their account with the transaction system 10.

It is envisioned that the transaction system 10 could also provide business solutions to smaller businesses by providing virtual storefronts with easy means to collect from customers. Further, by aggregating the customers charges to a credit card vendor, the small businesses would be able to avoid the swipe fees charged by credit card companies. Still further, funds could be moved peer-to-peer through the transaction system 10.

The subject technology enables businesses to expand sales beyond their physical location, increase commerce, and increase profitability. The systems and methods herein facilitate faster order processing and delivery of goods and services, reducing queue times, and increasing order accuracy. Order processing and other transactional costs are also reduced while increasing cyber security by providing a more secure environment and process for digital payments. In short, vendors can utilize the subject technology to improve the quality of interaction with their customers.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, interfaces, computers, servers and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the invention as defined by the appended claims.

What is claimed is:

1. A server for facilitating commerce, wherein the server communicates with clients via a distributed computing network, and wherein the server comprises:
(a) a memory storing: an instruction set including an application program interface (API); customer data related to a plurality of customers; and vendor data related to a plurality of vendors; and
(b) a processor for running the instruction set and API, the processor being in communication with the memory and the distributed computing network, wherein the processor is operative to:
  (i) use the API to provide a portion of the vendor data to a first client of a first customer based upon the client requesting the portion of the vendor data related to a first vendor at a location, wherein the server is provided by a host entity, wherein the host entity is different from the first vendor;
  (ii) use the API to receive an order for a first product of the first vendor from the client, wherein product data about the first product is included in the portion of the vendor data and the first product is available from the first vendor at a live ongoing event at the location;
  (iii) provide the order to a second client of the vendor so the vendor can fill the order to the first customer at the live ongoing event;
  (iv) use the API to collect funds in payment for the order from the first customer by using a portion of the customer data, wherein the funds are collected by the host entity;
  (v) pay at least a portion of the funds for the order to the vendor, wherein the payment is made by the host entity;
  (vi) use the API to enroll the first customer and the vendor in a network program associated with the live ongoing event, wherein the network program is for a limited time interval associated with the live ongoing event, wherein the first customer is attending the live ongoing event;
  (vii) form a group of friends in the memory, the group of friends including the first customer and a plurality of other customers;
  (viii) use the API to send notification to at least a portion of the group of friends that the first customer is at the live ongoing event; and
  (ix) use the API to allow any one of the other customers of the group of friends to purchase a second product for delivery to the first customer at the live ongoing event.

2. A server as recited in claim 1, further comprising the step of broadcasting a special offer via an electronic display at the live ongoing event for review by the first customer.

3. A server as recited in claim 1, wherein the first product is a lottery ticket associated with a jurisdiction.

4. A server as recited in claim 1, wherein the live ongoing event is broadcast live with offers to offsite audiences to become part of the group and purchase second products for delivery to members of the group.

5. A server as recited in claim 1, wherein the processor is further operative to recognize that the first client is at the location by using the API to interact with a mobile application and global positioning system (GPS) operating on the first client.

6. A method for facilitating commerce in a distributed computing network environment having a server of a host entity for communicating with clients, the method comprising the steps of:
storing in the server an instruction set, an application program interface (API), customer data related to a plurality of customers, and vendor data related to a plurality of vendors;
running the instruction set and API on the server;
enrolling, by the server, a first customer and a vendor in a network program associated with a live ongoing event, wherein the first customer is added to the customer data and attending the live ongoing event;
broadcasting a special offer via an electronic display at the live ongoing event for review by the first customer;
sending from the server a portion of the vendor data to a first client of the first customer based upon a request from the first client for a portion of the vendor data related to a first vendor, wherein the request is based on the special offer;
receiving at the server an order for a first product of the first vendor from the first client, wherein product data about the first product is included in the portion of the vendor data and the first product is available at a live ongoing event;
providing, from the server, the order to a second client of the vendor so the vendor can fill the order to the first customer at the live ongoing event;
collecting funds in payment for the order from the first customer by using a portion of the customer data, wherein the funds are collected by the host entity using the server and API;
paying at least a portion of the funds for the order to the vendor, wherein the payment is made by the host entity and the host entity retains a portion of the funds as a fee for providing the server;
forming a group of friends in the server using the API, the group of friends including the first customer and a plurality of other customers;
sending notification to at least a portion of the group of friends that the first customer is at the live ongoing event; and
allowing any one of the other customers of the group of friends to purchase a second product for delivery to the first customer at the live ongoing event.

7. A method as recited in claim 6, wherein the live ongoing event is broadcast live with offers to offsite audiences to become part of the group and purchase second products for delivery to members of the group.

8. A method as recited in claim 6, further comprising the step of recognizing that the first client is at the location by using the API to interact with a mobile application and global positioning system (GPS) operating on the first client.

* * * * *